(12) United States Patent
Gopal et al.

(10) Patent No.: US 10,191,684 B2
(45) Date of Patent: Jan. 29, 2019

(54) TECHNOLOGIES FOR FLEXIBLY COMPRESSING AND DECOMPRESSING DATA

(71) Applicant: Intel Corporation, Santa Clara, CA (US)

(72) Inventors: Vinodh Gopal, Westborough, MA (US); James D. Guilford, Northborough, MA (US); Kirk S. Yap, Westborough, MA (US); Daniel F. Cutter, Maynard, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/719,735

(22) Filed: Sep. 29, 2017

(65) Prior Publication Data
US 2018/0152201 A1 May 31, 2018

Related U.S. Application Data

(60) Provisional application No. 62/427,268, filed on Nov. 29, 2016.

(30) Foreign Application Priority Data

Aug. 30, 2017 (IN) .............................. 201741030632

(51) Int. Cl.
*H03M 7/30* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01); *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01);
(Continued)

(58) Field of Classification Search
CPC .................................................. H03M 7/6017
USPC ...................................................... 341/50–87
See application file for complete search history.

(56) References Cited

U.S. PATENT DOCUMENTS 5,467,087 A * 11/1995 Chu .................... H03M 7/3086
341/51
9,613,394 B2 * 4/2017 Akenine-Moller ....... G06T 1/60
(Continued)

*Primary Examiner* — Lam T Mai
(74) *Attorney, Agent, or Firm* — Barnes & Thornburg LLP

(57) ABSTRACT

Technologies for flexibly compressing data include a computing device having an accelerator complex that is to receive a compression job request and schedule the compression job request for one or more hardware compression resources of the accelerator complex. The accelerator complex is further to perform the compression job request with the one or more hardware compression resources in response to scheduling the compression job request and to communicate uncompressed data and compressed data with an I/O subsystem of the computing device in response to performing the compression job request. Other embodiments are described and claimed.

25 Claims, 16 Drawing Sheets

(51) Int. Cl.
  *G06F 17/30*      (2006.01)
  *H03M 7/40*       (2006.01)
  *H04L 12/26*      (2006.01)
  *H04L 12/813*     (2013.01)
  *H04L 12/851*     (2013.01)
  *G06F 11/07*      (2006.01)
  *G06F 11/30*      (2006.01)
  *G06F 11/34*      (2006.01)
  *G06F 7/06*       (2006.01)
  *G06T 9/00*       (2006.01)
  *H03M 7/42*       (2006.01)
  *H04L 12/28*      (2006.01)
  *H04L 12/46*      (2006.01)
  *H04L 29/12*      (2006.01)
  *G06F 13/16*      (2006.01)
  *G06F 21/62*      (2013.01)
  *G06F 21/76*      (2013.01)
  *H03K 19/173*     (2006.01)
  *H04L 9/08*       (2006.01)
  *H04L 12/933*     (2013.01)
  *H04L 29/08*      (2006.01)
  *G06F 9/38*       (2018.01)
  *G06F 9/48*       (2006.01)
  *G06F 9/50*       (2006.01)
  *G06F 12/06*      (2006.01)
  *G06T 1/20*       (2006.01)
  *G06T 1/60*       (2006.01)
  *G06F 9/54*       (2006.01)
  *G06F 8/656*      (2018.01)
  *G06F 8/658*      (2018.01)
  *G06F 8/654*      (2018.01)
  *G06F 9/4401*     (2018.01)
  *H01R 13/453*     (2006.01)
  *H01R 13/631*     (2006.01)
  *H05K 7/14*       (2006.01)
  *G06F 21/57*      (2013.01)
  *G06F 21/73*      (2013.01)
  *G06F 8/65*       (2018.01)
  *G06F 11/14*      (2006.01)
  *G06F 12/02*      (2006.01)
  *H04L 12/24*      (2006.01)
  *H04L 29/06*      (2006.01)
  *G06F 15/80*      (2006.01)

(52) U.S. Cl.
  CPC ......... *G06F 9/3891* (2013.01); *G06F 9/4401* (2013.01); *G06F 9/4881* (2013.01); *G06F 9/505* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3409* (2013.01); *G06F 12/0284* (2013.01); *G06F 12/0692* (2013.01); *G06F 13/1652* (2013.01); *G06F 17/30153* (2013.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 63/1425* (2013.01)

(56) References Cited

U.S. PATENT DOCUMENTS

| | | | |
|---|---|---|---|
| 2007/0139837 A1* | 6/2007 | Usui | H02M 1/32 361/91.1 |
| 2014/0351229 A1* | 11/2014 | Gupta | G06F 17/30153 707/693 |
| 2016/0173125 A1* | 6/2016 | Yang | H03M 7/60 707/693 |
| 2017/0139823 A1* | 5/2017 | Tomlin | G06F 3/0611 |
| 2017/0139838 A1* | 5/2017 | Tomlin | G06F 3/0611 |

* cited by examiner

TECHNOLOGIES FOR FLEXIBLY COMPRESSING AND DECOMPRESSING DATA

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

Compression schemes are often used in a data centers to compress data, thereby enabling compute devices in the data center to store more customer data in a given amount of data storage capacity and/or transmit more customer data in a given amount of network bandwidth. As such, the data compression is an important computer operation used in many computing applications, including both server and client applications. For example, data compression may be used to reduce network bandwidth requirements and/or storage requirements for cloud computing applications. Many common lossless compression formats are based on the LZ77 compression algorithm. The data compression is usually performed at different compression level (e.g., 1 thru 9 in gzip/zlib), where each level increases the effort spent in finding matches and thereby sacrificing speed for compression ratio. Traditionally, the compression level is specified by an application or a user and the underlying hardware engine uses that to configure its search/matching effort.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
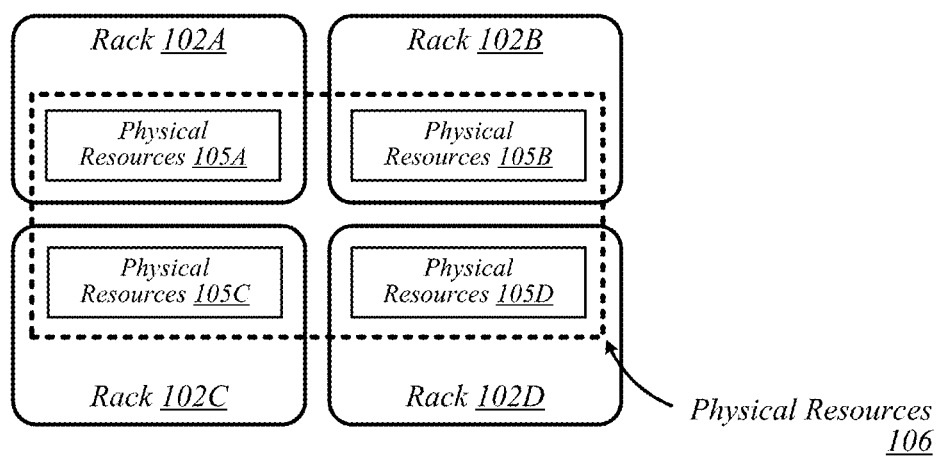
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. In the present description, near memory may be embodied as any memory, such as volatile memory, coupled to the host central processing unit via a high bandwidth, low latency connection for efficient processing while far memory may be embodied as any memory, such as volatile or nonvolatile memory storage, that is larger and slower than the near memory, and is typically coupled to the central processing unit via a comparatively lower bandwidth and/or higher latency connection. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low-latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
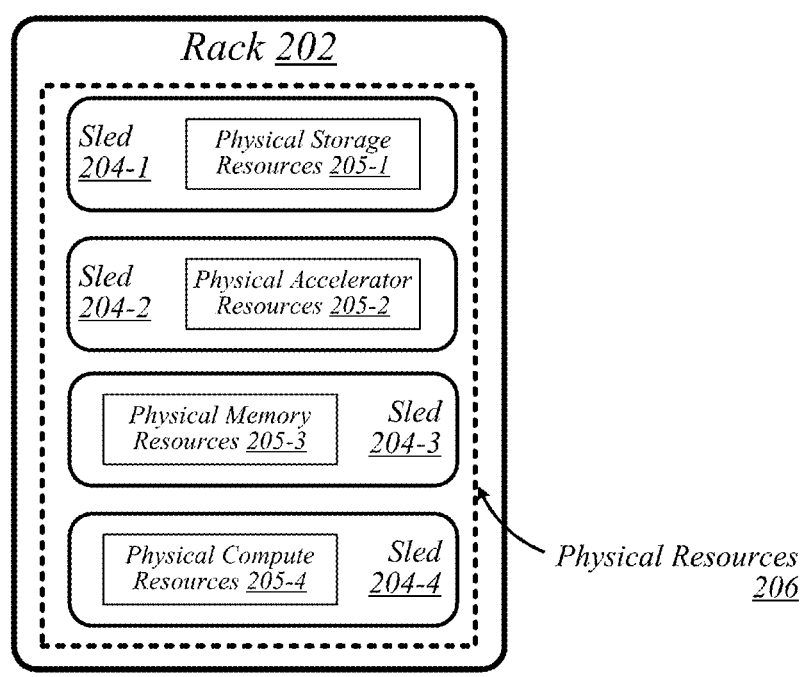
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
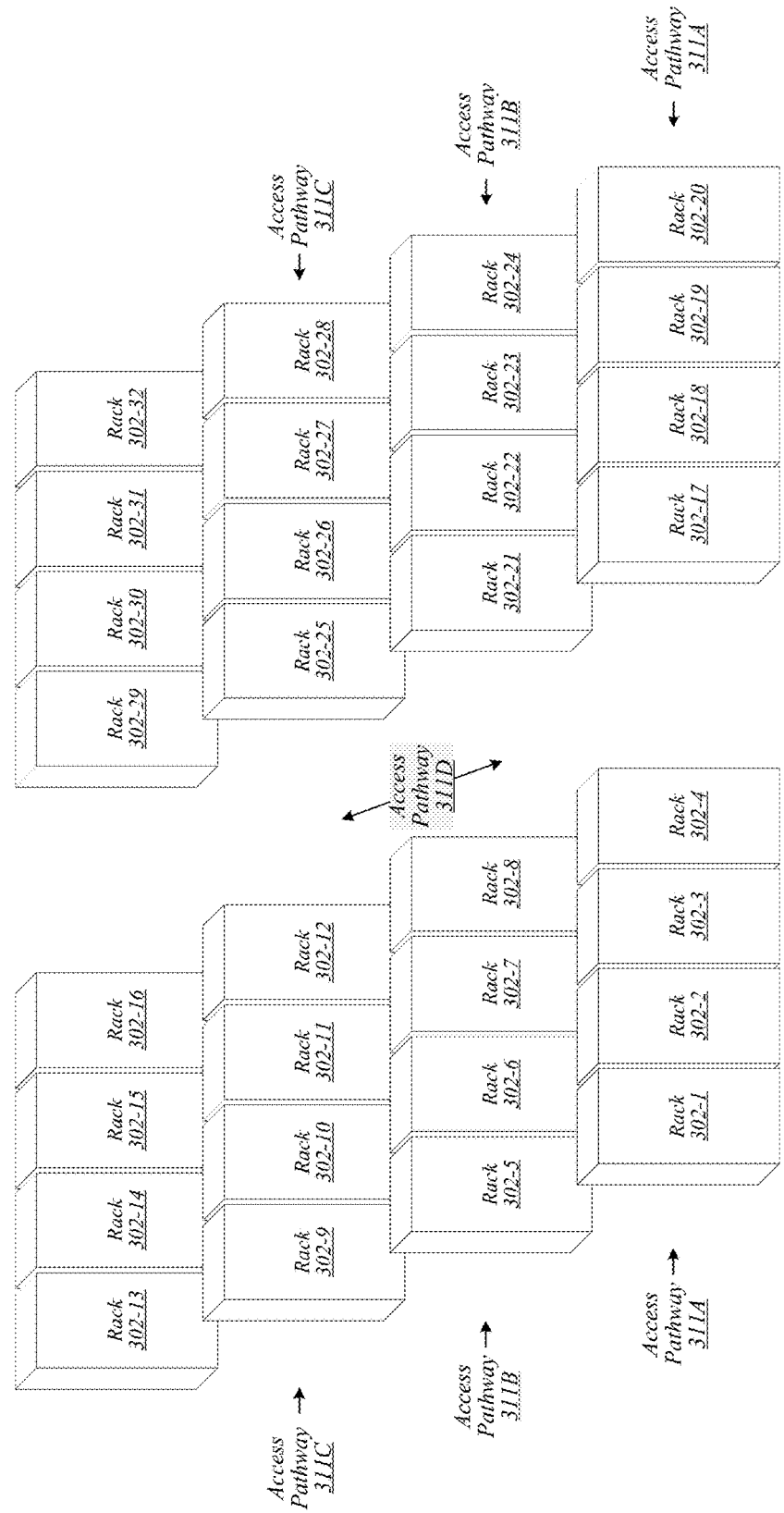
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
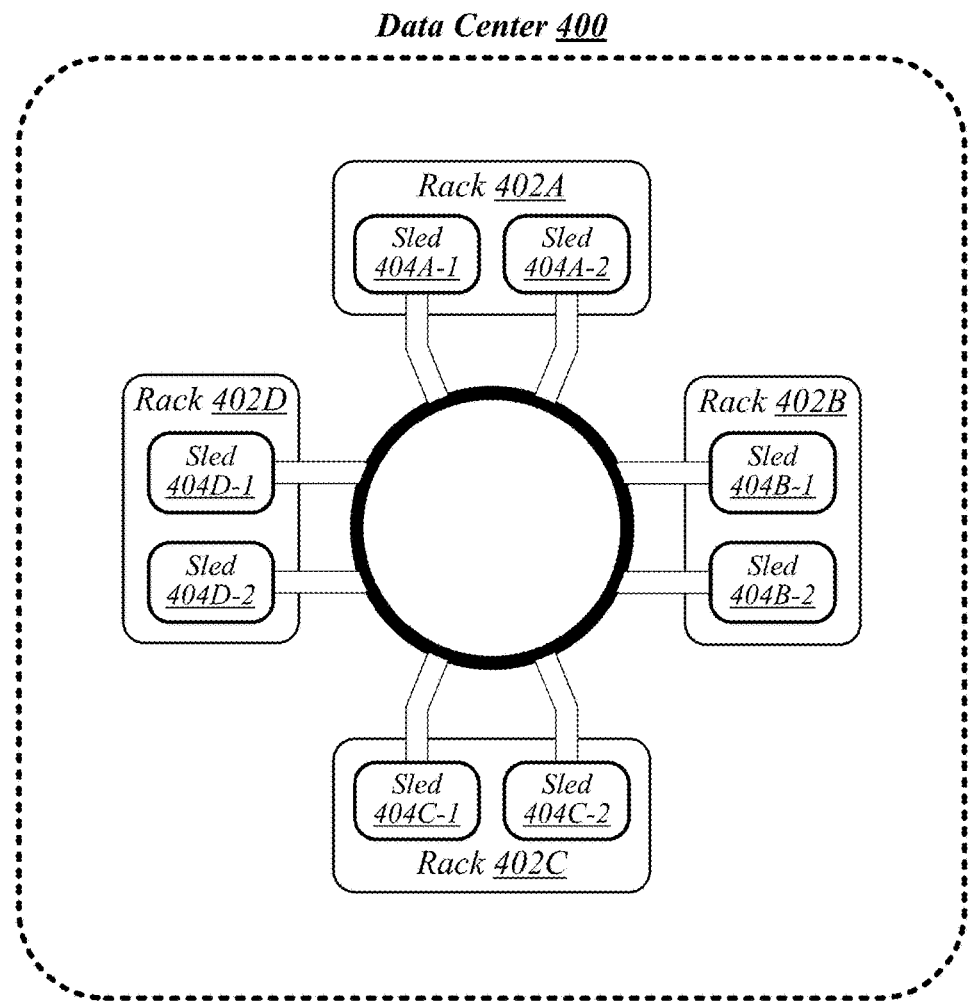
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
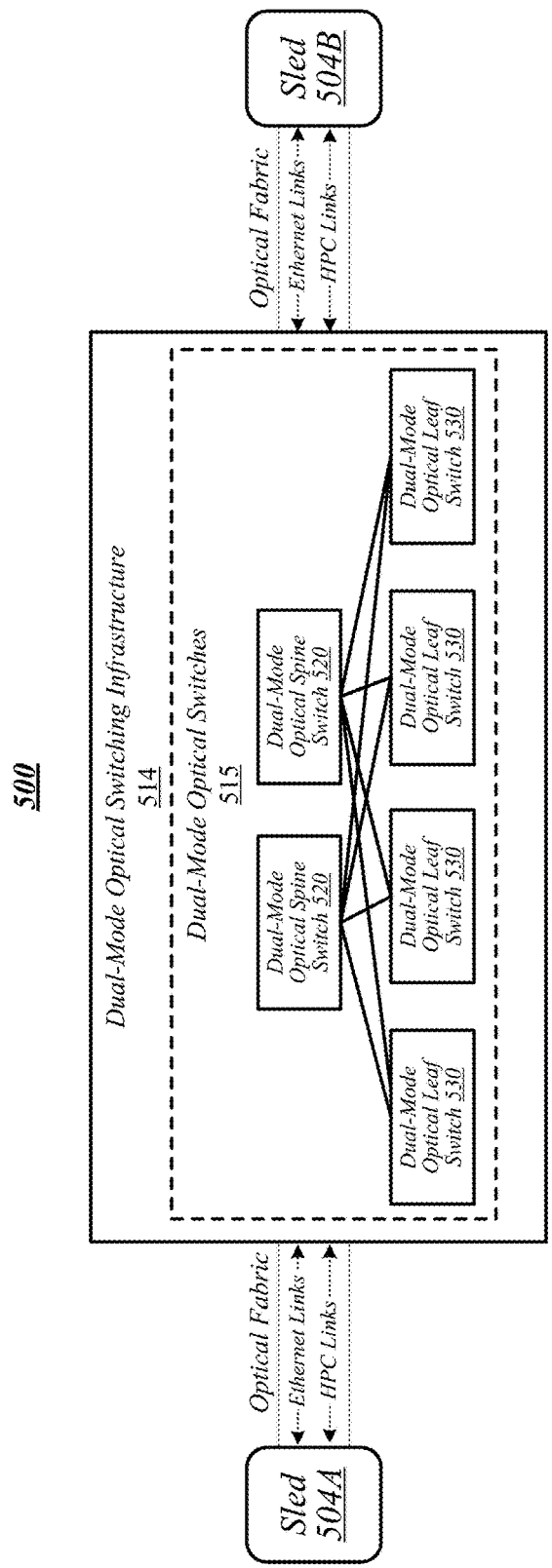
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
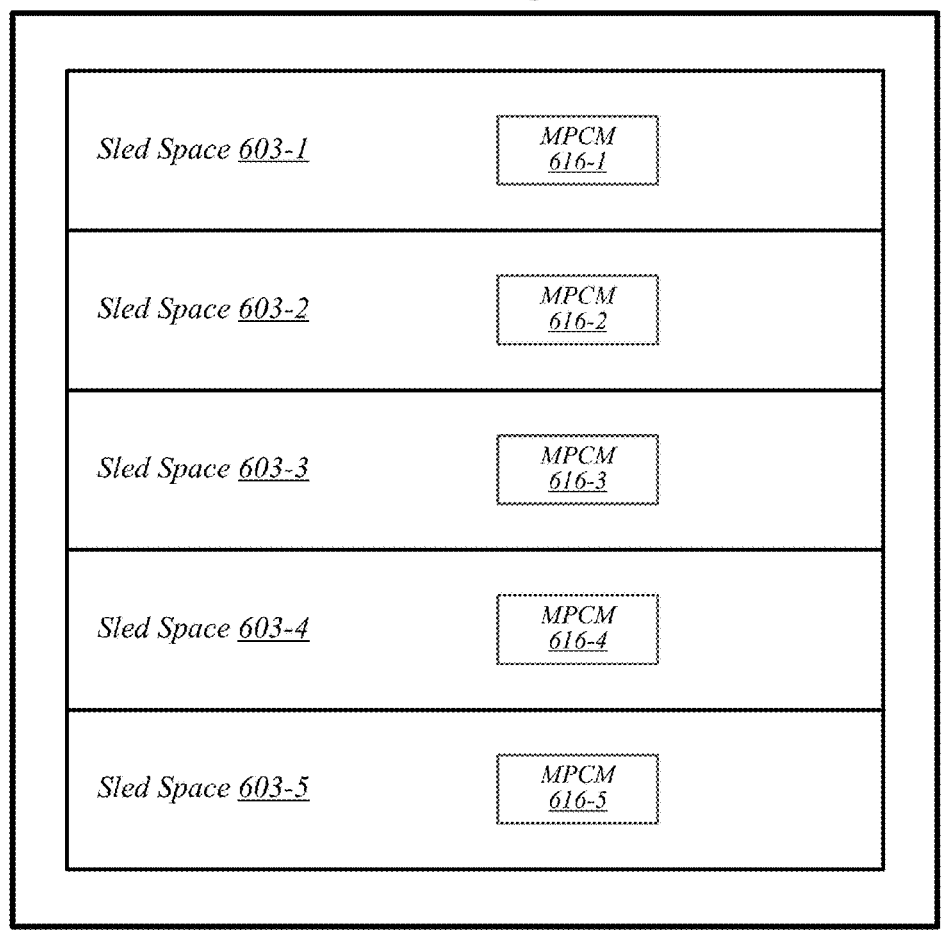
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
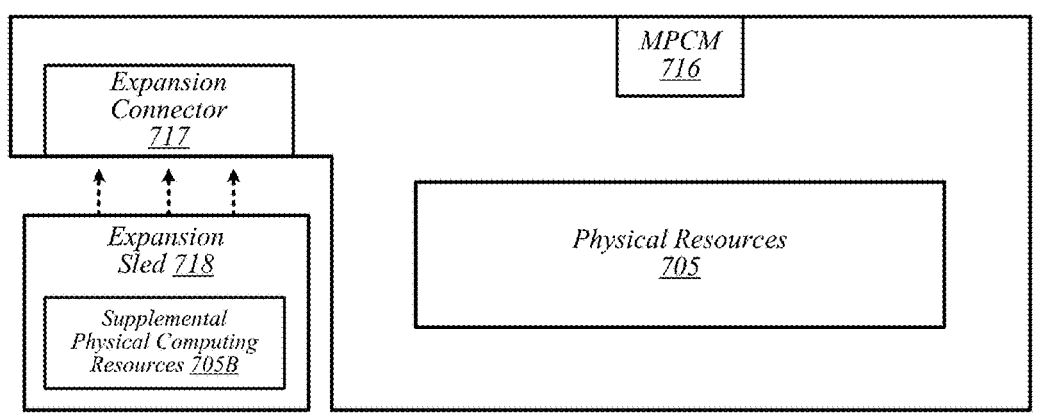
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
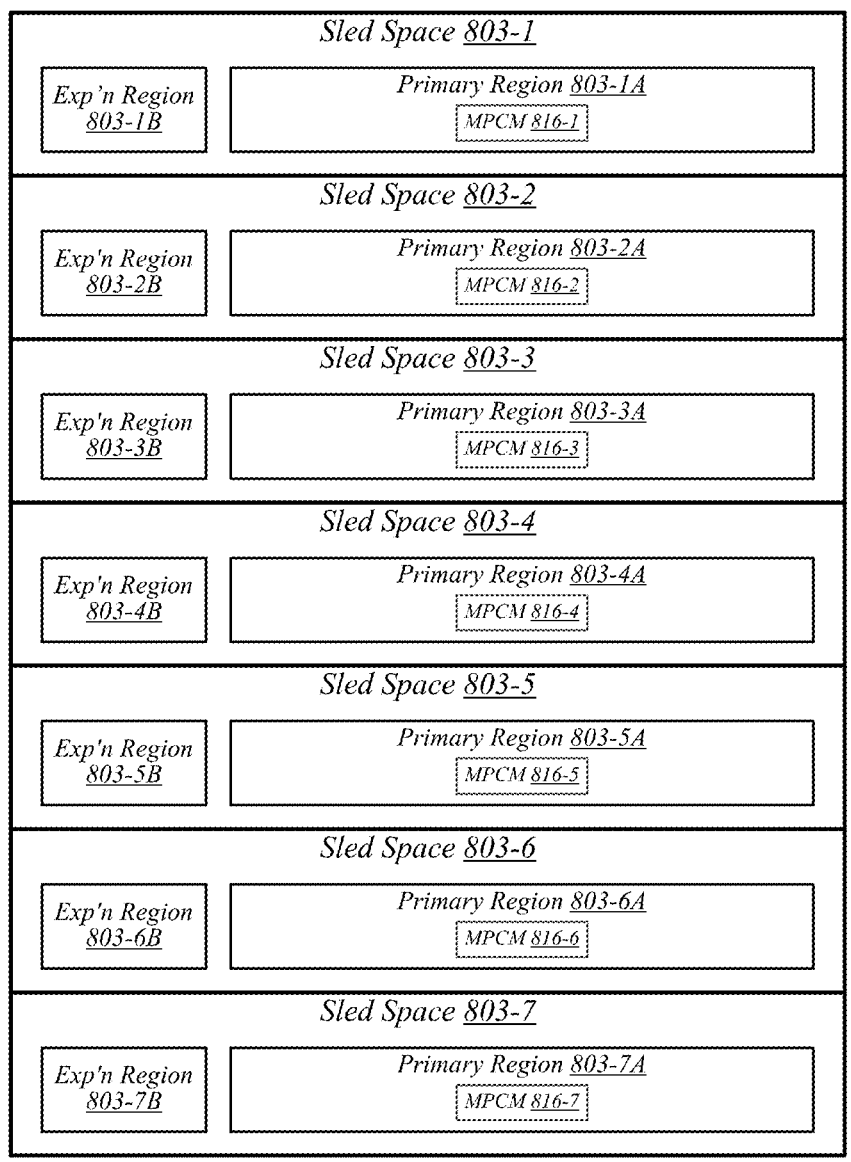
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
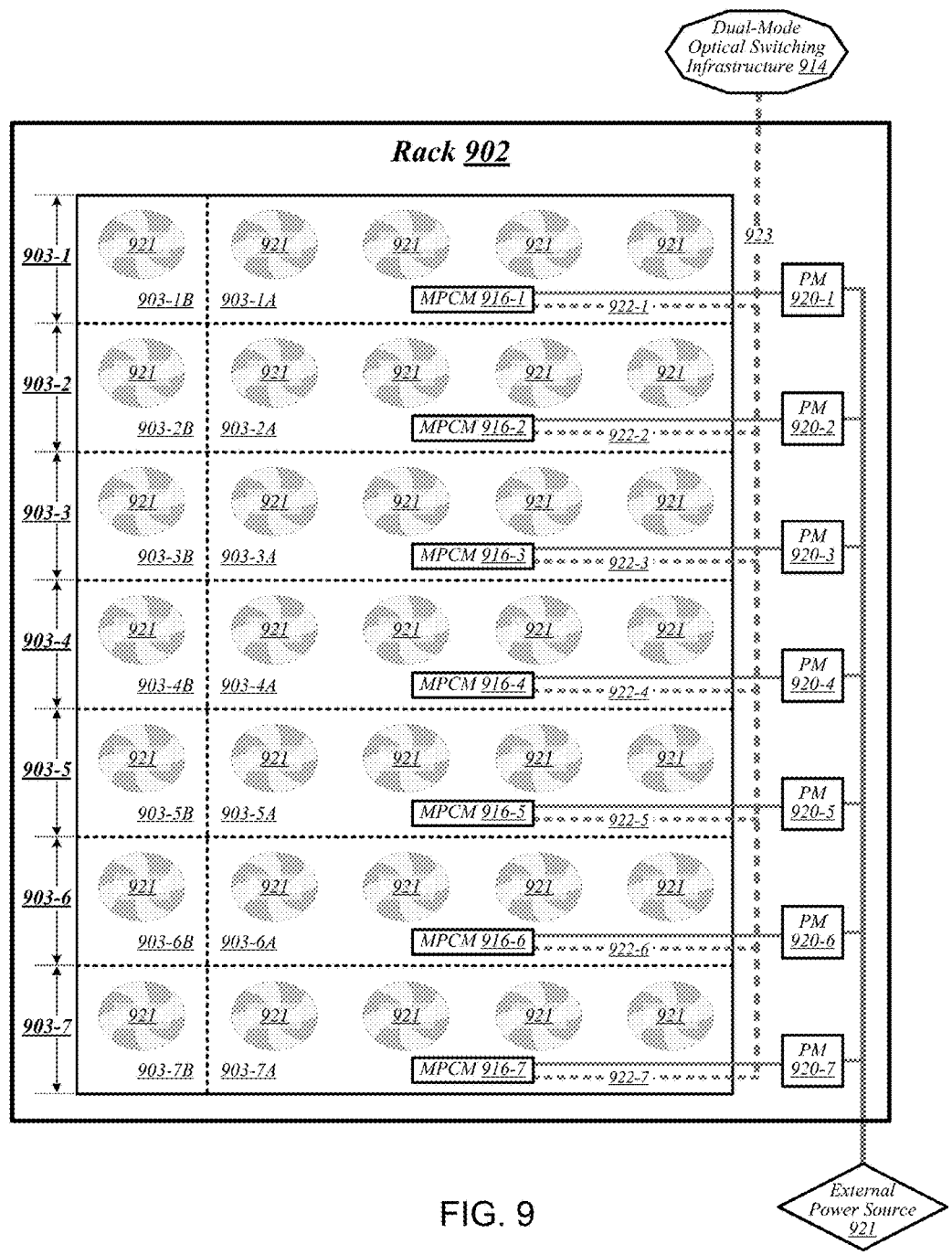
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
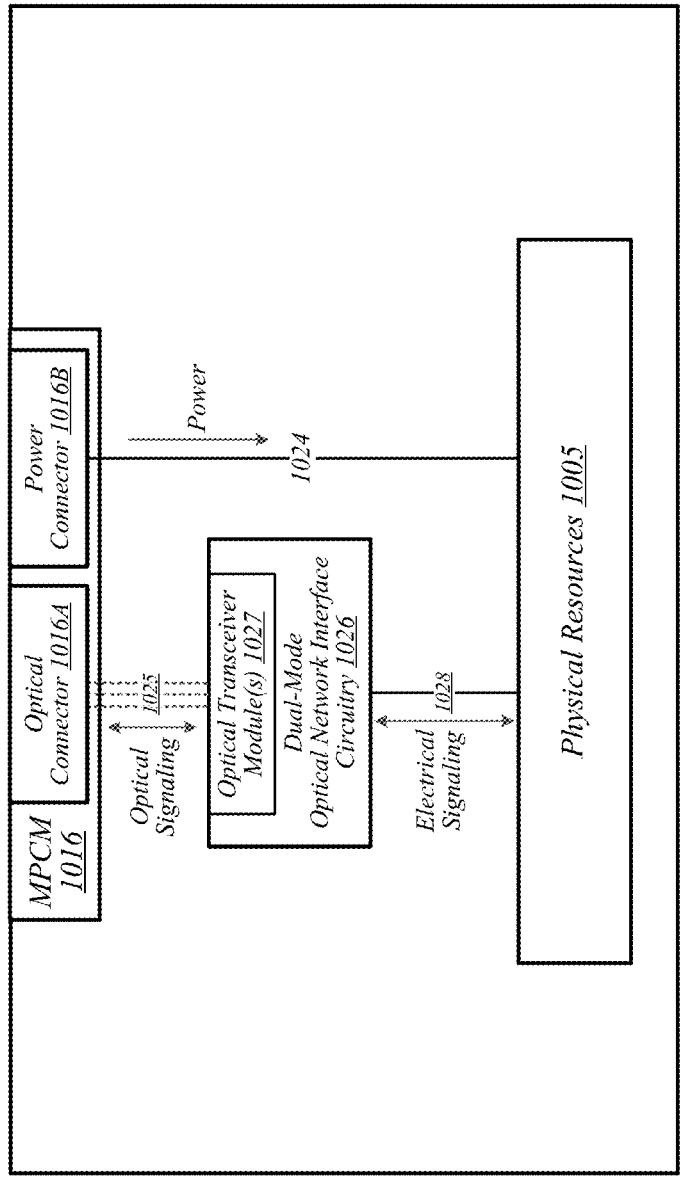
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
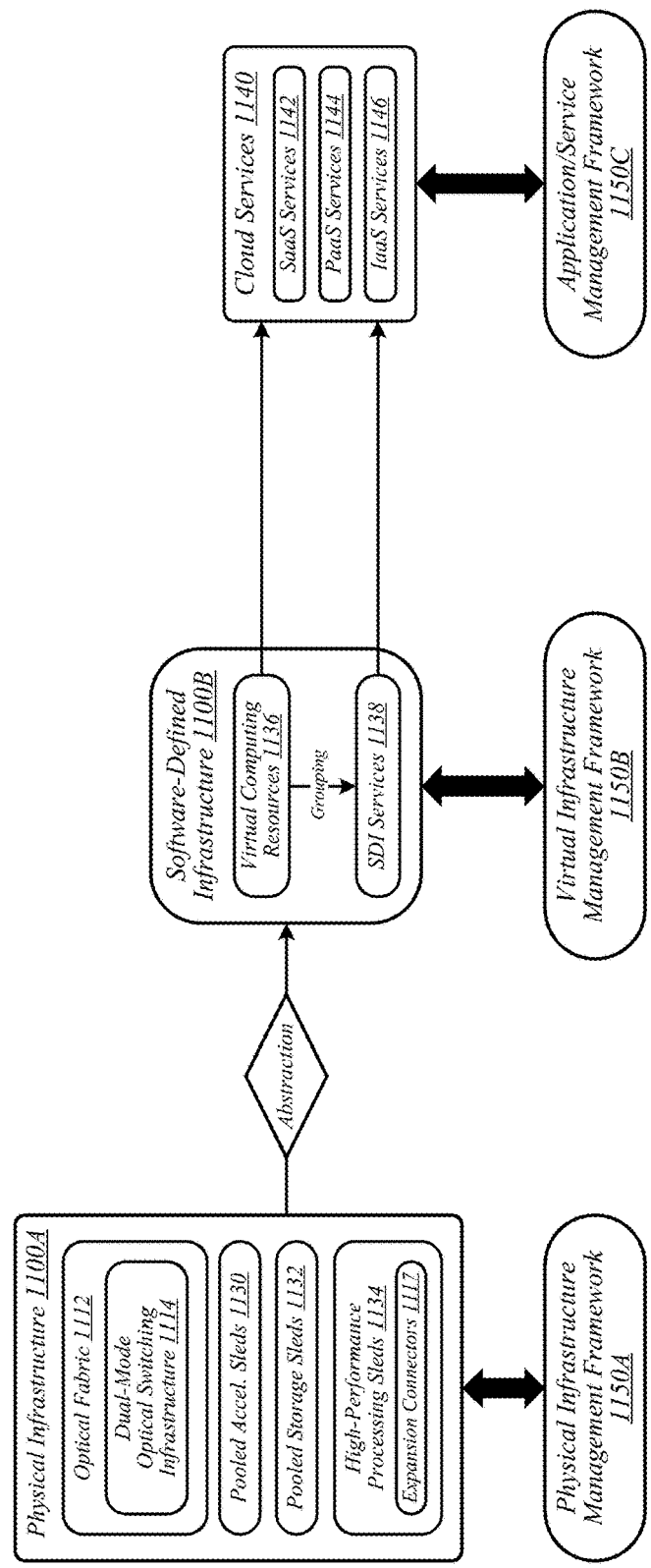
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs) (e.g., a controller coupled to a non-volatile memory chip, such as NAND, and an interface to a host device). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a memory expansion sled, such that the memory that is locally available to that high-performance processing sled 1134 is disaggregated from the processors and memory comprised on that sled. In some embodiments, such a high-performance processing sled 1134 may be configured with memory using an expansion sled that comprises a low-latency SSD. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
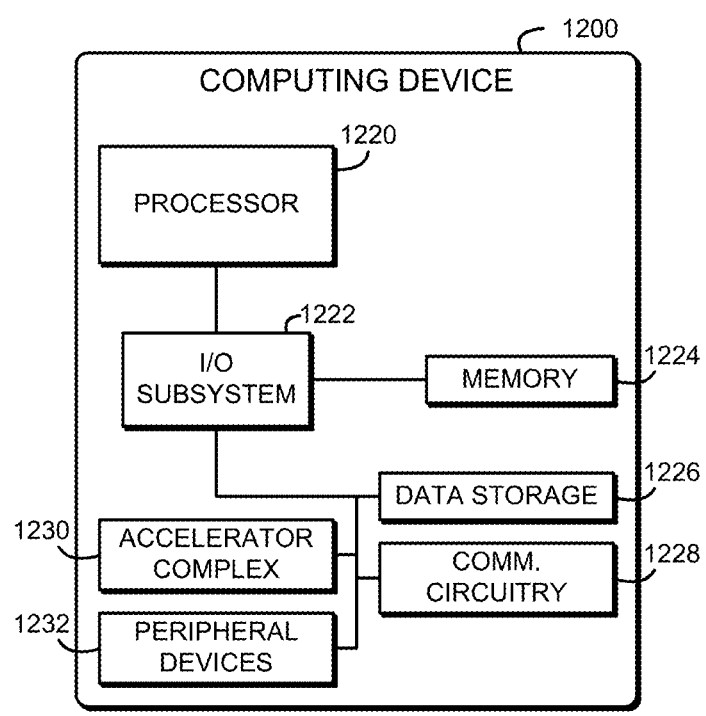
FIG. 12 is a simplified block diagram of at least one embodiment of a computing device for flexibly compressing and decompressing input data.

Referring now to FIG. 12, an illustrative computing device 1200 for flexible compression and decompression includes a processor 1220, an input/output (I/O) subsystem 1222, a memory 1224, a data storage device 1226, and an accelerator complex 1230. The computing device 1200 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center. In use, as described below, the computing device 1200 receives one or more compression job requests that are performed by the accelerator complex 1230. The accelerator complex 1230 is configured to optimize performance at the system level, balancing single-stream performance, latency, throughput, and reliability goals. The accelerator complex 1230 includes one or more compress/decompress/verify engines and one or more decompress engines that are configured to perform compression job requests. The compression job request may include a request to perform a compression operation (e.g., compress, compress/verify, or decompress).

When a request to compress uncompressed input data is submitted to the accelerator complex 1230, the accelerator complex 1230 offloads the uncompressed input data to a compress/decompress/verify engine to generate compressed output data based on a compression level specified in the compression job request. For example, the compression level may be predefined by an application or a user. In the illustrative embodiment, the accelerator complex 1230 may dynamically adjust the compression level of the compression job if the compression level is flexible in order to optimize performance based on latency and/or throughput of the accelerator complex 1230. It should be appreciated that a higher compression level may increase latency and decrease throughput. Likewise, a lower compression level may decrease latency and increase throughput. Additionally, the compression job request may include a compression verification request to verify the compressed output data. The compression verification may be performed by the same compress/decompress/verify engine or a decompress engine based on bandwidth availability of the accelerator complex 1230. Similarly, when a request to decompress compressed input data is submitted to the accelerator complex 1230, the accelerator complex 1230 may schedule decompression jobs to a decompress engine or a compress/decompress/verify engine based on bandwidth availability. Thus, the accelerator complex 1230 may dynamically coordinate a flow of the job requests to manage traffic flow of the I/O subsystem.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1200 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1200. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1200, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1200 may also include a communications subsystem 1228, which may be embodied as any communication circuit, device, or collection thereof, capable of enabling communications between the computing device 1200 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

The accelerator complex 1230 may be embodied as any coprocessor, application-specific integrated circuit (ASIC), field-programmable gate array (FPGA), functional block, IP core, or other hardware accelerator of the computing device 1200 capable of compressing data and otherwise performing the functions described herein. In particular, the accelerator complex 1230 may include one or more compress/decompress/verify engines and one or more decompress engines that are configured to perform compression job requests. As discussed above, a compression job request may include a request to perform a compression operation (e.g., compress, compress and verify, or decompress). It should be appreciated that the accelerator complex 1230 may include a different number of the compress/decompress/verify engines and the decompress engines. For performing a compression operation, the accelerator complex 1230 may communicate uncompressed input data and compressed output data by performing one or more direct memory access (DMA) operations to the memory 1224 or by otherwise communicating with the processor 1220. Alternatively, for performing a decompression operation, the accelerator complex 1230 may communicate compressed input data and decompressed output data by performing one or more direct memory access (DMA) operations to the memory 1224 or by otherwise communicating with the processor 1220. Additionally or alternatively, although illustrated as a separate component, it should be understood that in some embodiments the accelerator complex 1230 may be integrated with or otherwise form a portion of one or more other components of the computing device 1200, such as the processor 1220 and/or the I/O subsystem 1222.

The computing device 1200 may further include one or more peripheral devices 1232. The peripheral devices 1232 may include any number of additional input/output devices, interface devices, hardware accelerators, and/or other peripheral devices. For example, in some embodiments, the peripheral devices 1232 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 13:
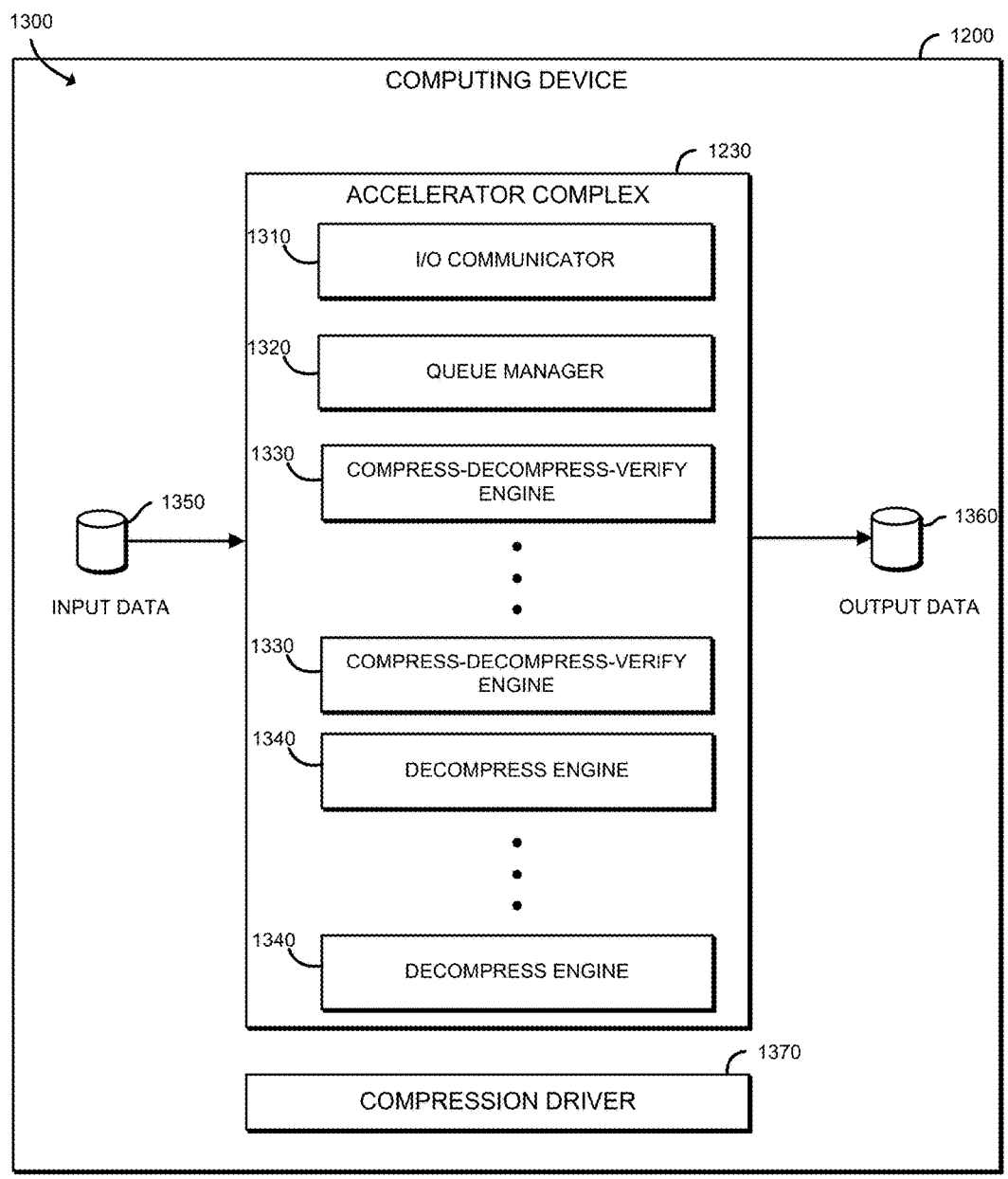
FIG. 13 is a simplified block diagram of at least one embodiment of an environment that may be established by the computing device of FIG. 12.

Referring now to FIG. 13, in the illustrative embodiment, the computing device 1200 may establish an environment 1300 during operation. The illustrative environment 1300 includes the accelerator complex 1230 and a compression driver 1370. The accelerator complex 1230 illustratively includes an input/output (I/O) communicator 1310, a queue manager 1320, multiple compress-decompress-verify engines 1330, and multiple decompress engines 1340. The accelerator complex 1230 is coupled to input data 1350 and output data 1360. The input data 1350 may include uncompressed input data and/or compressed input data. The output data 1360 may include compressed output data and/or uncompressed output data.

The various components of the environment 1300 may be embodied as hardware, firmware, software, or a combination thereof. As such, in some embodiments, one or more of the components of the environment 1300 may be embodied as circuitry or a collection of electrical devices (e.g., input/output (I/O) communicator circuitry 1310, queue manager circuitry 1320, compress-decompress-verify engine circuitry 1330, decompress engine circuitry 1340, and/or compression driver circuitry 1370). It should be appreciated that, in such embodiments, one or more of the input/output (I/O) communicator circuitry 1310, the queue manager circuitry 1320, the compress-decompress-verify engine circuitry 1330, the decompress engine circuitry 1340, and/or or the compression driver circuitry 1370 may form a portion of one or more of the processor 1220, the accelerator complex 1230, the I/O subsystem 1222, and/or other components of the computing device 1200. Additionally, in some embodiments, one or more of the illustrative components may form a portion of another component and/or one or more of the illustrative components may be independent of one another.

The input/output (I/O) communicator 1310 is configured to facilitate inbound and outbound communications between the accelerator complex 1230 and the I/O subsystem 1222. To do so, the I/O communicator 1310 is configured to receive and process input data (i.e., a compression job request) from a requesting device or system via the I/O subsystem 1222 and to perform and send output data back to the requesting device or system via the I/O subsystem 1222.

The queue manager 1320 is configured to manage a queue of the accelerator complex 1230 and to coordinate a flow of the job requests over the I/O subsystem 1222 of the computing device 1200. The queue manager 1320 is configured to schedule compression job requests (e.g., compress requests, compress and verify requests, and/or decompress requests) to one or more hardware compression resources of the accelerator complex 1230, such as the compress-decompress-verify engines 1330 and/or the decompress engines 1340. The queue manager 1320 may determine the available bandwidth of the I/O subsystem 1222 and manage the available bandwidth of the I/O subsystem 1222 within a predefined range to optimize performance of the computing device 1200 by adjusting the latency and/or throughput of the accelerator complex 1230. For example, a compression job with a high compression level and/or extra compression verification step may increase latency and decrease throughput of the accelerator complex 1230, and thus may decrease the bandwidth used by the accelerator complex 1230. In such case, if the queue manager 1320 may determine that the used bandwidth of the I/O subsystem 1222 exceeds the predefined range (e.g., not enough bandwidth is available), the queue manager 1320 may communicate with the accelerator complex 1230 to increase the compression level and/or perform a compression verification step.

Each compress-decompress-verify engine 1330 is configured to compress uncompressed input data (e.g., from the input data 1350) to generate compressed output data according to a compression level of a compression job request. As discussed above, the compression level may be adjusted based on the available bandwidth of the I/O subsystem 1222. Additionally, the compress-decompress-verify engine 1330 may further verify the compressed output data to confirm that the compression has been successful. To do so, the compress-decompress-verify engine 1330 is configured to decompress the compressed output data and compare the decompressed output data byte-by-byte against the original uncompressed input data. Additionally, in some embodiments, the compress-decompress-verify engine 1330 may decompress compressed input data to generate decompressed output data, for example if a decompress engine 1340 is not available.

The decompress engine 1340 is configured to decompress compressed input data to generate decompressed output data. As discussed above, in some embodiments, the decompress engine 1340 may further verify compressed output data of a compression job performed by a compress-decompress-verify engine. For example, if the compress-decompress-verify engine that performed the compression is not available to further perform a compression verification step, the compressed output data may be fed into an available decompress engine. The decompression engine 1340 then decompresses the compressed output data and compares the decompressed output data byte-by-byte against the original uncompressed input data stored in the input data database 1350.

It should be appreciated that, in some embodiments, the requested compression job may be spread across multiple jobs, and the computing device 1200 may verify the compressed output data by computing a checksum (e.g., CRC64) of the decompressed output data. To do so, the computing device 1200 may compute an original checksum of the uncompressed input data that is being compressed across all the jobs. Additionally, the computing device 1200 may send each compressed output data of the compression job into a decompress engine 1340 to decompress the compressed output data and generate a checksum for each compressed output data. In such embodiments, a decompress engine 1340 that computes a checksum of the last job of the requested compression job may compare the resulting checksum of the entire decompressed output data to the original checksum of the uncompressed input data.

Alternatively, in other embodiments, the computing device 1200 may check the resulting checksum to the original checksum using a compression driver 1370. The compression driver 1370 is configured to receive compressed output data from a compress/decompress/verify engine and perform a verification of the compressed output data. The compression driver 1370 is an interface between a higher-level software and the accelerator complex 1230 that collects and submits job request to the hardware components of the computing device 1200.

Figure 14A:
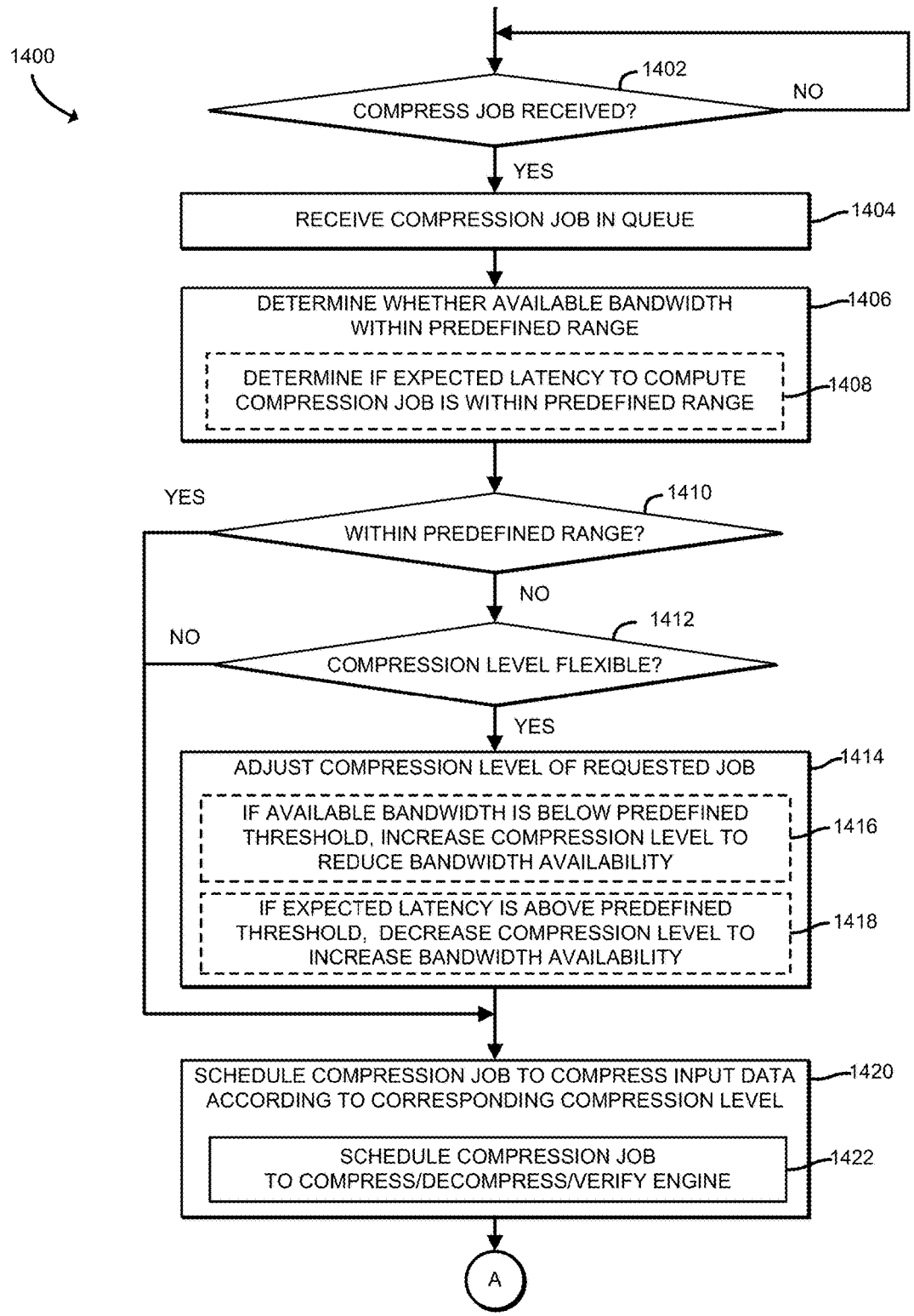
FIGS. 14A and 14B are a simplified flow diagram of at least one embodiment of a method for flexibly compressing data that may be performed by the computing device of FIGS. 12 and 13.
Figure 14B:
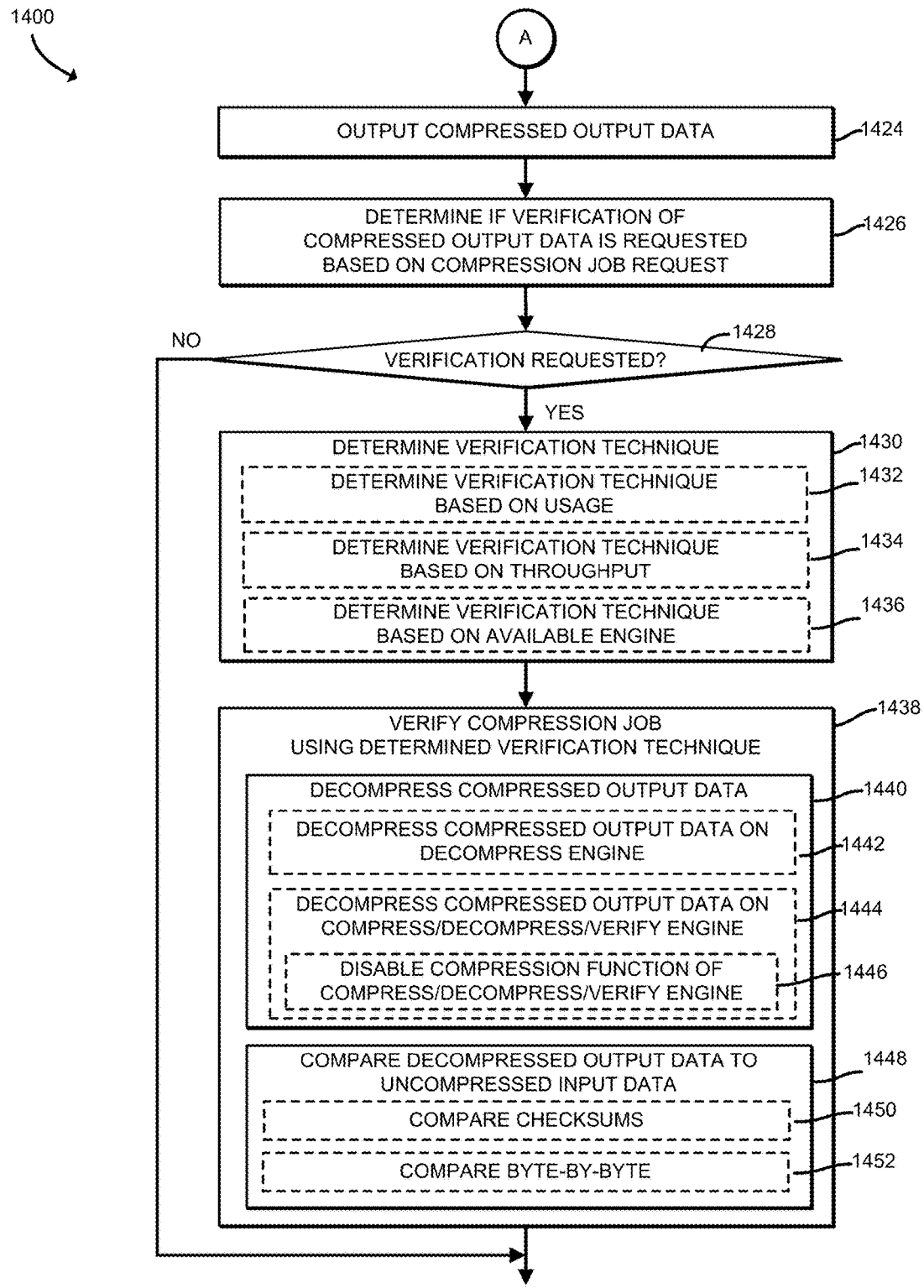

Referring now to FIGS. 14A and 14B, in use, the computing device 1200 may execute a method 1400 for performing a compression job request to compress uncompressed input data. The method 1400 begins in block 1402, in which the computing device 1200 determines whether a compression job request (i.e., a job request to compress uncompressed input data) has been received. If the computing device 1200 determines that a compression job request has not been received, the method 1400 loops back to block 1402 to continue monitoring for a compression job request. If, however, the computing device 1200 determines that a compression job request has been received, the method 1400 advances to block 1404.

In block 1404, the computing device 1200 receives a compression job request in a queue of the accelerator complex 1230. The compression job request may include or otherwise identify uncompressed input data to be compressed. The compression job request may also specify a requested compression level and/or whether the requested compression level is flexible. In block 1406, as the received job is dequeued from the queue, the computing device 1200 determines whether the available bandwidth of the I/O subsystem 1222 is within a predefined range. As discussed above, the computing device 1200 is configured to coordinate a flow of the job requests to manage traffic flow of the I/O subsystem 1222 within a predefined range. To determine whether I/O bandwidth is within the predefined range, in some embodiments in block 1408, the computing device 1200 may determine whether the expected time needed to compute the received compression job (i.e., expected latency) is within a predefined range. It should be appreciated that the predefined range for the expected latency is different than the predefined range for the I/O bandwidth availability. The computing device 1200 may use any appropriate technique to determine the expected time to complete the received compression job. For example, the computing device 1200 may determine the expected time based on a number of jobs in the queue. As another example, the computing device 1200 may determine the expected time to complete each job pending in the queue by multiplying the size of the job in bytes by the expected number of processor cycles per byte, which may vary for example between 0.5-10 cycles/byte for compression levels 1-9. The computing device 1200 may determine the overall time required by adding all the expected times of the jobs pending in the queue.

If the computing device 1200 determines that the available bandwidth of the I/O subsystem 1222 is within the predefined range in block 1410, the method 1400 skips ahead to block 1420 to schedule the compression job to compress the uncompressed input data according to a requested compression level specified by the user or the application. In other words, if the available bandwidth is within the predefined range, the computing device 1200 determines that the throughput of the I/O subsystem does not need to be adjusted, so the uncompressed input data may be compressed according to the requested compression level of the compression job. Referring back to block 1410, if the computing device 1200 determines that the available bandwidth is not within the predefined range, the method 1400 advances to block 1412.

In block 1412, the computing device 1200 determines whether a compression level of the requested job can be adjusted to adjust the availability of the bandwidth of the I/O subsystem 1222. For example, a compression job with a higher compression level may take longer to perform, which may increase latency while decreasing the bandwidth used by the accelerator complex 1230 (increasing available I/O subsystem 1222 bandwidth). However, if the computing device 1200 determines that the compression level is not flexible, the method 1400 skips ahead to block 1420 to schedule the compression job to compress the input data according to the requested compression level specified by the user or the application. In other words, if the compression level of the compression job is not flexible, the computing device 1200 determines that the compression level cannot be adjusted and proceeds to compress the requested job based on the requested compression level.

Referring back to block 1412, if the computing device 1200 determines that the compression is flexible, the method 1400 advances to block 1414 to adjust the compression level of the requested job. For example, in block 1416, if the computing device 1200 determines that the available bandwidth is below a predefined threshold, the computing device 1200 may increase the compression level of the requested job to reduce the bandwidth usage such that the bandwidth availability rises above the threshold. Increasing the compression level may reduce the compression ratio achieved, that is, reduce the size of the compressed output data as compared to the uncompressed input data, which may in turn reduce bandwidth usage. Additionally or alternatively, in block 1418, if the computing device 1200 determines that the expected latency (or time to finish compute) is above a predefined threshold, the computing device 1200 may decrease the compression level of the requested job to reduce the expected time to compute. Decreasing the compression level may increase the compression ratio achieved, that is, increase the size of the compressed output data as compared to the uncompressed input data (which may also increase the bandwidth usage). It should be appreciated that, in some embodiments, if the computing device 1200 determines that both the available bandwidth is below the predefined threshold and the expected latency is above the predefined threshold, the computing device 1200 may prefer to lower the compression level to increase the bandwidth availability to process more compression jobs. Additionally or alternatively, although described as adjusting the compression level of the requested job, it should be appreciated that, in some embodiments, the computing device 1200 may adjust the compression level of any pending compression job based on current available bandwidth and/or expected latency.

In block 1420, the computing device 1200 schedules the compression job to compress the uncompressed input data according to the compression level. To do so, the computing device 1200 schedules compression job to a compress/decompress/verify engine 1330 in block 1422. Subsequently, in block 1424, shown in FIG. 14B, the computing device 1200 outputs compressed output data. In block 1426, the computing device 1200 determines if a verification of the compressed output data is requested based on the compression job request. If the computing device 1200 determines that the verification is not requested in block 1428, the computing device 1200 ends the method 1400.

If, however, the computing device 1200 determines that the verification is requested, the method 1400 advances to block 1430. In block 1430, the computing device 1200 determines a verification technique to be used to verify the compressed output data. To do so, in some embodiments, the computing device 1200 may determine a usage of the compression data in block 1432. The usage may be embodied as whether the compression job was requested as part of a large, multi-part operation spread across multiple compression jobs or as a single-shot compression job. A multi-part job may be verified using two techniques: as a separate decompress request using checksum verification or as a separate decompress request using byte-compare verification. A single-shot job may be verified using those two techniques plus an additional single-shot verification using the same compress-decompress-verify engine 1330.

Additionally, in some embodiments, the computing device 1200 may determine a verification technique based on the available bandwidth of the I/O subsystem 1222 in block 1434. In other embodiments, the computing device 1200 may determine a verification technique based on available compression engines (e.g., one or more compress/decompress/verify engines 1330 or one or more decompress engines 1340) in block 1436. As described above, the verification technique may include a single-shot operation, checksum verification, and/or a full data comparison. For example, in some embodiments, if an entire data of the requested compression job was scheduled as a single job on a compress/decompress/verify engine 1330, the computing device 1200 determines whether the same compress/decompress/verify engine 1330 is available to perform the verification. If the same compress/decompress/verify engine 1330 is available, the same compress/decompress/verify engine 1330 is used to decompress the compressed output data and compare the decompressed output data byte-by-byte against the uncompressed input data.

Alternatively, in some embodiments, if the computing device 1200 determines that the compress/decompress/verify engine 1330 is not available, the computing device 1200 may send the compressed output data to an available decompress engine 1340 to generate a decompressed output data and compare the decompressed output data byte-by-byte against the uncompressed input data. It should be appreciated that, in some embodiments, a low-level software (e.g., the compression driver 1370) may be used to compare a decompressed output data byte-by-byte against the uncompressed input data.

In yet other embodiments, the requested compression job may be spread across multiple jobs, the computing device 1200 may verify the compressed output data by computing a checksum (e.g., CRC64) of the output data. To do so, the computing device 1200 may compute an original checksum of the uncompressed input data that is being compressed across all the jobs. Additionally, the computing device 1200 may send each compressed output data of the compression job into a decompress engine 1340 to decompress the compressed output data and generate a checksum for each compressed output data. In such embodiments, a decompress engine 1340 that computes a checksum of the last job of the requested compression job may check the resulting checksum of the entire decompressed output data against the original checksum of the uncompressed input data to verify the compression job. Alternatively, in other embodiments, the computing device 1200 may check the resulting checksum to the original checksum using low-level software, such as the compression driver 1370.

Subsequently, in block 1438, the computing device 1200 verifies the compression job using the determined verification technique. To do so, the computing device 1200 decompresses the compressed output data in block 1440 and compares the decompressed output data to uncompressed input data using the determined verification technique in block 1448. As described above, depending on the determined verification technique, the computing device 1200 may decompress the compressed output data using a decompression engine 1340 in block 1442. Alternatively, in other embodiments, the computing device 1200 may decompress the compressed output data using a compress/decompress/verify engine 1330 in block 1444. Specifically, the computing device 1200 may decompress the compressed output data on the same compress/decompress/verify engine 1330 that compressed the uncompressed input data. In some embodiments, in block 1446, the computing device 1200 may disable a compression function of the compress/decompress/verify engine 1330 to perform the decompression and verification of the compressed output data. To compare the decompressed output data to the uncompressed input data in block 1448, as described above, the computing device 1200 may compare a checksum of the decompressed output data to an original checksum of the uncompressed input data in block 1450. Alternatively, the computing device 1200 may compare the decompressed output data byte-by-byte against the uncompressed input data in block 1452 to verify the compressed output data. After verifying the compression job, the method 1400 is completed. The computing device 1200 may continue to execute the method 1400 to service additional compression job requests.

Figure 15:
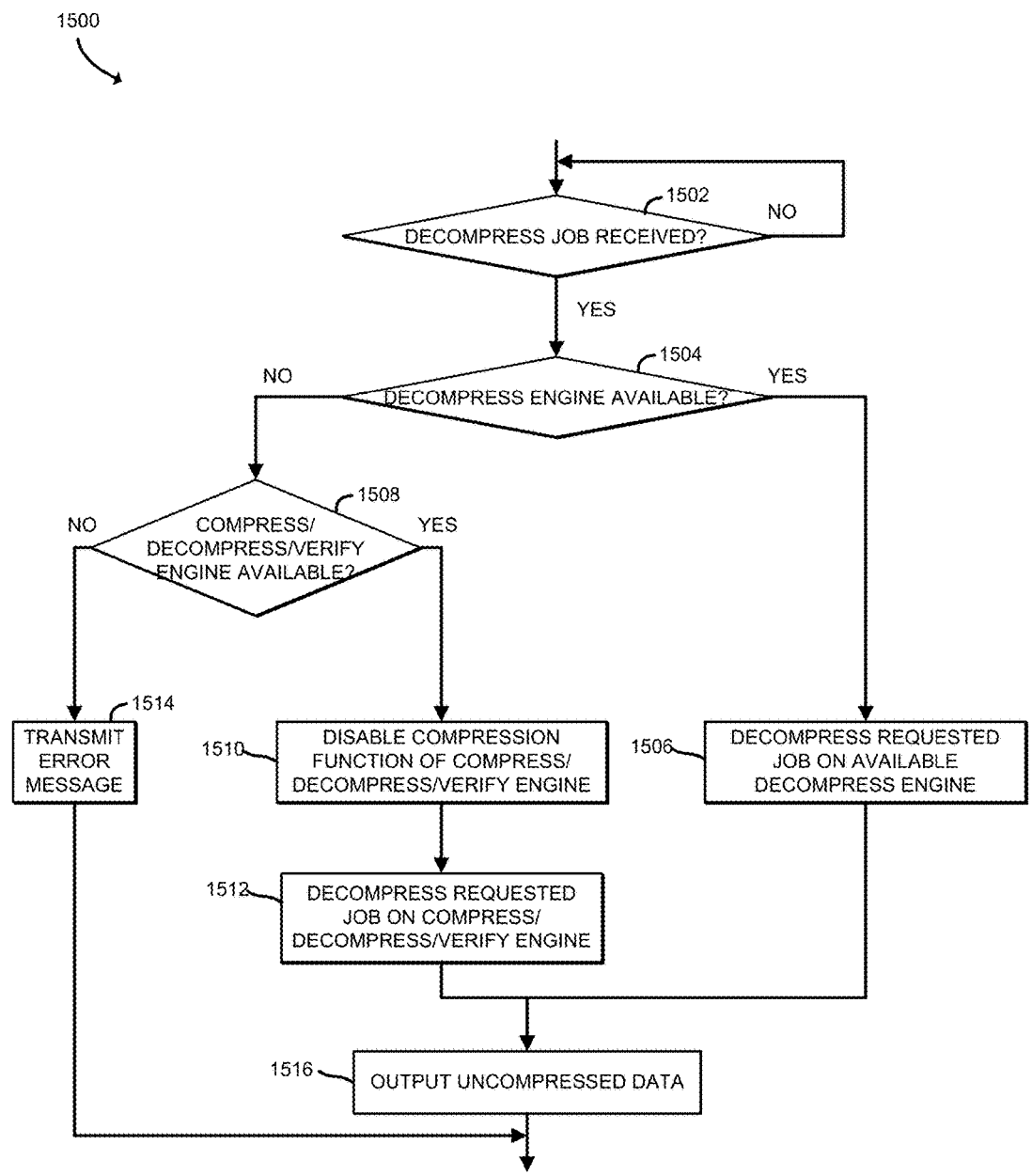
FIG. 15 is a simplified flow diagram of at least one embodiment of a method for flexibly decompressing data that may be performed by the computing device of FIGS. 12 and 13.

Referring now to FIG. 15 in use, the computing device 1200 may execute a method 1500 for performing a compression job request to decompress compressed input data to generate compressed output data. The method 1500 begins in block 1502, in which the computing device 1200 determines whether decompression job request (i.e., a request to decompress compressed input data) has been received. If the computing device 1200 determines that a request has not been received, the method 1500 loops back to block 1502 to continue monitoring for a decompression request. If, however, the computing device 1200 determines that a request has been received, the method 1500 advances to block 1504.

In block 1504, the computing device 1200 determines whether one or more decompress engines 1340 are available. If the computing device 1200 determines at least one decompress engine 1340 is available, the method 1500 advances to block 1506, in which the computing device 1200 sends the compressed input data to the available decompress engine 1340 to be decompressed. After performing the decompression, the available decompress engine 1340 outputs uncompressed output data in block 1516. It should be appreciated that, in some embodiments, the computing device 1200 may compute and return a checksum of the uncompressed output data, which may be compared to a checksum of original uncompressed data that may have been included in the compression job request, for example by the compression driver 1370.

Referring back to block 1504, if the computing device 1200 determines that a decompress engine 1340 is not available, the method 1500 branches to block 1508. In block 1508, the computing device 1200 determines whether one or more compress/decompress/verify engines 1330 is available. If the computing device 1200 determines that a compress/decompress/verify engine 1330 is not available, the method 1500 branches to block 1514, in which the computing device 1200 may transmit an error message to a requester. Additionally or alternatively, in some embodiments the computing device 1200 may enqueue, stall, or otherwise delay the job request until an engine 1330, 1340 is available.

Referring back to block 1508, if the computing device 1200 determines that a compress/decompress/verify engine 1330 is available, the method 1500 branches to block 1510. In block 1510, the computing device 1200 disables a compression function of the available compress/decompress/verify engine 1330. Subsequently, in block 1512, the compressed input data is sent to the available compress/decompress/verify engine 1330 to be decompressed. Subsequently, the available compress/decompress/verify engine 1330 outputs uncompressed output data in block 1516. It should be appreciated that, in some embodiments, the computing device 1200 may compute and return a checksum of the uncompressed output data, which may be compared to a checksum of original uncompressed data that may have been included in the compression job request, for example by the compression driver 1370. After performing the decompression operation, the method 1500 is completed. The computing device 1200 may continue to execute the method 1500 to service additional compression job requests.

EXAMPLES

Illustrative examples of the technologies disclosed herein are provided below. An embodiment of the technologies may include any one or more, and any combination of, the examples described below.

Example 1 includes a computing device for flexibly compressing data, the computing device comprising an accelerator complex to receive a compression job request; schedule the compression job request for one or more hardware compression resources of the accelerator complex; perform the compression job request with the one or more hardware compression resources in response to scheduling of the compression job request; and communicate uncompressed data and compressed data with an I/O subsystem of the computing device in response to performance of the compression job request.

Example 2 includes the subject matter of Example 1, and further comprising one or more processors, wherein the accelerator complex is to receive the compression job request from the one or more processors.

Example 3 includes the subject matter of any of Examples 1 and 2, and wherein the compression job request comprises a compress request to compress the uncompressed data, the one or more hardware compression resources comprises a compress/decompress/verify engine, to perform the compression job request comprises to compress the uncompressed data to generate the compressed data with the compress/decompress/verify engine, and to communicate the uncompressed data and the compressed data comprises to input the uncompressed data and to output the compressed data.

Example 4 includes the subject matter of any of Examples 1-3, and wherein to schedule the compression job request comprises to (i) determine whether a compression level of the compression job request is flexible, and (ii) adjust, in response to a determination that the compression level of the compression job request is flexible, the compression level based on I/O bandwidth availability.

Example 5 includes the subject matter of any of Examples 1-4, and wherein to determine whether the compression level of the compression job request is flexible comprises to determine whether a requester specified that a compression level of the compression job request is flexible.

Example 6 includes the subject matter of any of Examples 1-5, and wherein to schedule the compression job request further comprises to adjust, in response to a determination that the compression level of the compression job request is flexible, the compression level based on an estimated time to compute the compression job request.

Example 7 includes the subject matter of any of Examples 1-6, and wherein to schedule the compression job request further comprises to determine the estimated time to compute the compression job request based on a number of jobs in a queue of the I/O subsystem.

Example 8 includes the subject matter of any of Examples 1-7, and wherein to adjust the compression level based on the I/O bandwidth availability and the estimated time to compute comprises to increase the compression level to achieve lower compression ratio.

Example 9 includes the subject matter of any of Examples 1-8, and wherein to adjust the compression level based on the I/O bandwidth availability and the estimated time to compute comprises to decrease the compression level to achieve higher compression ratio.

Example 10 includes the subject matter of any of Examples 1-9, and wherein to schedule the compression job request comprises to (i) determine whether one or more compression levels of compression job requests pending in a queue of the I/O subsystem are flexible, and (ii) adjust, in response to a determination that the one or more compression levels of the compression job requests are flexible, the one or more compression levels based on I/O bandwidth availability and on an estimated time to compute the compression job requests pending in the queue.

Example 11 includes the subject matter of any of Examples 1-10, and wherein the compression job request comprises a compress-verify request to compress the uncompressed data to generate compressed data and verify the compressed data, the one or more hardware compression resources comprises a compress/decompress/verify engine, to perform the compression job request comprises to (i) compress the uncompressed data to generate the compressed data and (ii) verify the compressed data against the uncompressed data, and to communicate the uncompressed data and the compressed data comprises to input the uncompressed data and to output the compressed data.

Example 12 includes the subject matter of any of Examples 1-11, and wherein to compress the uncompressed data comprises to compress the uncompressed data to generate the compressed data with the compress/decompress/verify engine; and to verify the compressed data comprises to verify the compressed data with the compress/decompress/verify engine.

Example 13 includes the subject matter of any of Examples 1-12, and wherein to verify the compressed data with the compress/decompress/verify engine comprises to (i) disable a compression function of the compress/decompress/verify engine and (ii) decompress the compressed data with the compress/decompress/verify engine.

Example 14 includes the subject matter of any of Examples 1-13, and wherein to verify the compressed data with the compress/decompress/verify engine comprises to decompress the compressed data with the compress/decompress/verify engine as a single-shot operation.

Example 15 includes the subject matter of any of Examples 1-14, and wherein the one or more hardware compression resources comprises a decompress engine, and to verify the compressed data comprises to verify the compressed data with the decompress engine using a verification technique.

Example 16 includes the subject matter of any of Examples 1-15, and wherein the verification technique comprises a checksum verification with the decompress engine.

Example 17 includes the subject matter of any of Examples 1-16, and wherein the verification technique comprises a full data comparison with the decompress engine.

Example 19 includes the subject matter of any of Examples 1-17, and wherein to verify the compressed data with the decompress engine using the verification technique comprises to verify the compressed data using a verification technique based on an available bandwidth of the I/O subsystem.

Example 19 includes the subject matter of any of Examples 1-18, and wherein to verify the compressed data comprises to verify the compressed data by a low-level software component of the computing device.

Example 20 includes the subject matter of any of Examples 1-19, and wherein the compression job request comprises a decompress request to decompress the compressed data, to perform the compression job request comprises to decompress the compressed data to generate the uncompressed data, and to communicate the uncompressed data and the compressed data comprises to input the compressed data and to output the uncompressed data.

Example 21 includes the subject matter of any of Examples 1-20, and wherein the one or more hardware compression resources comprises a decompress engine, and to decompress the compressed data comprises to decompress the compressed data with the decompress engine.

Example 22 includes the subject matter of any of Examples 1-21, and wherein the one or more hardware compression resources comprises a compress/decompress/verify engine, and to decompress the compressed data comprises to decompress the compressed data with the compress/decompress/verify engine.

Example 23 includes the subject matter of any of Examples 1-22, and wherein to decompress the compressed data with the compress/decompress/verify engine comprises to disable a compression function of the compress/decompress/verify engine.

Example 24 includes the subject matter of any of Examples 1-23, and wherein to perform the compression job request comprises to select a hardware compression resource from the one or more hardware compression resources of the accelerator complex to perform the compression job request based on an I/O bandwidth availability.

Example 25 includes the subject matter of any of Examples 1-24, and wherein the I/O bandwidth availability is determined based on a number of jobs in a queue of the I/O subsystem.

Example 26 includes a method for flexibly compressing data, the method comprising receiving, by an accelerator complex of a computing device, a compression job request; scheduling, by the accelerator complex, the compression job request for one or more hardware compression resources of the accelerator complex; performing, by the accelerator complex, the compression job request with the one or more hardware compression resources in response to scheduling the compression job request; and communicating, by the accelerator complex, uncompressed data and compressed data with an I/O subsystem of the computing device in response to performing the compression job request.

Example 27 includes the subject matter of Example 26, and wherein receiving the compression job request comprises receiving the compression job request from one or more processors of the computing device.

Example 28 includes the subject matter of any of Examples 26 and 27, and wherein the compression job request comprises a compress request to compress the uncompressed data, the one or more hardware compression resources comprises a compress/decompress/verify engine, performing the compression job request comprises compressing the uncompressed data to generate the compressed data with the compress/decompress/verify engine, and communicating the uncompressed data and the compressed data comprises inputting the uncompressed data and outputting the compressed data.

Example 29 includes the subject matter of any of Examples 26-28, and wherein scheduling the compression job request comprises determining whether a compression level of the compression job request is flexible; and adjusting, in response to determining that the compression level of the compression job request is flexible, the compression level based on an I/O bandwidth availability.

Example 30 includes the subject matter of any of Examples 26-29, and wherein determining whether the compression level of the compression job request is flexible comprises determining whether a requester specified that a compression level of the compression job request is flexible.

Example 31 includes the subject matter of any of Examples 26-30, and wherein scheduling the compression job request further comprises adjusting, in response to determining that the compression level of the compression job request is flexible, the compression level based on an estimated time to compute the compression job request.

Example 32 includes the subject matter of any of Examples 26-31, and wherein scheduling the compression job request further comprises determining the estimated time to compute the compression job request based on a number of jobs in a queue of the I/O subsystem.

Example 33 includes the subject matter of any of Examples 26-32, and wherein adjusting the compression level based on the I/O bandwidth availability and the estimated time to compute comprises increasing the compression level to achieve lower compression ratio.

Example 34 includes the subject matter of any of Examples 26-33, and wherein adjusting the compression level based on the I/O bandwidth availability and the estimated time to compute comprises decreasing the compression level to achieve higher compression ratio.

Example 35 includes the subject matter of any of Examples 26-34, and wherein scheduling the compression job request comprises (i) determining whether one or more compression levels of compression job requests pending in a queue of the I/O subsystem are flexible, and (ii) adjusting, in response to determining that the one or more compression levels of the compression job requests are flexible, the one or more compression levels based on I/O bandwidth availability and on an estimated time to compute the compression job requests pending in the queue.

Example 36 includes the subject matter of any of Examples 26-35, and wherein the compression job request comprises a compress-verify request to compress the uncompressed data to generate compressed data and verify the compressed data, the one or more hardware compression resources comprises a compress/decompress/verify engine, performing the compression job request comprises (i) compressing the uncompressed data to generate the compressed data and (ii) verifying the compressed data against the uncompressed data, and communicating the uncompressed data and the compressed data comprises inputting the uncompressed data and outputting the compressed data.

Example 37 includes the subject matter of any of Examples 26-36, and wherein compressing the uncompressed data comprises compressing the uncompressed data to generate the compressed data with the compress/decompress/verify engine; and verifying the compressed data comprises verifying the compressed data with the compress/decompress/verify engine.

Example 38 includes the subject matter of any of Examples 26-37, and wherein verifying the compressed data with the compress/decompress/verify engine comprises (i) disabling a compression function of the compress/decompress/verify engine and (ii) decompressing the compressed data with the compress/decompress/verify engine.

Example 39 includes the subject matter of any of Examples 26-38, and wherein verifying the compressed data with the compress/decompress/verify engine comprises decompressing the compressed data with the compress/decompress/verify engine as a single-shot operation.

Example 40 includes the subject matter of any of Examples 26-39, and wherein the one or more hardware compression resources comprises a decompress engine, and verifying the compressed data comprises verifying the compressed data with the decompress engine using a verification technique.

Example 41 includes the subject matter of any of Examples 26-40, and wherein the verification technique comprises a checksum verification with the decompress engine.

Example 42 includes the subject matter of any of Examples 26-41, and wherein the verification technique comprises a full data comparison with the decompress engine.

Example 43 includes the subject matter of any of Examples 26-42, and wherein verifying the compressed data with the decompress engine using the verification technique comprises verifying the compressed data using a verification technique based on an available bandwidth of the I/O subsystem.

Example 44 includes the subject matter of any of Examples 26-43, and wherein verifying the compressed data comprises verifying the compressed data by a low-level software component of the computing device.

Example 45 includes the subject matter of any of Examples 26-44, and wherein the compression job request comprises a decompress request to decompress the compressed data, performing the compression job request comprises decompressing the compressed data to generate the uncompressed data, and communicating the uncompressed data and the compressed data comprises inputting the compressed data and outputting the uncompressed data.

Example 46 includes the subject matter of any of Examples 26-45, and wherein the one or more hardware compression resources comprises a decompress engine, and decompressing the compressed data comprises decompressing the compressed data with the decompress engine.

Example 47 includes the subject matter of any of Examples 26-46, and wherein the one or more hardware compression resources comprises a compress/decompress/verify engine, and decompressing the compressed data comprises decompressing the compressed data with the compress/decompress/verify engine.

Example 48 includes the subject matter of any of Examples 26-47, and wherein decompressing the compressed data with the compress/decompress/verify engine comprises disabling a compression function of the compress/decompress/verify engine.

Example 49 includes the subject matter of any of Examples 26-48, and wherein performing the compression job request comprises selecting a hardware compression resource from the one or more hardware compression resources of the accelerator complex to perform the compression job request based on I/O bandwidth availability.

Example 50 includes the subject matter of any of Examples 26-49, and wherein the I/O bandwidth availability is determined based on a number of jobs in a queue of the I/O subsystem.

Example 51 includes one or more machine-readable storage media comprising a plurality of instructions stored thereon that, when executed by a processor, cause the processor to perform the method of any of Examples 26-50.

Example 52 includes a method for flexibly compressing data, the method comprising means for receiving, by an accelerator complex of a computing device, a compression job request; means for scheduling, by the accelerator complex, the compression job request for one or more hardware compression resources of the accelerator complex; means for performing, by the accelerator complex, the compression job request with the one or more hardware compression resources in response to scheduling the compression job request; and means for communicating, by the accelerator complex, uncompressed data and compressed data with an I/O subsystem of the computing device in response to performing the compression job request.

Example 53 includes the subject matter of Example 52, and wherein the means for receiving the compression job request comprises means for receiving the compression job request from one or more processors of the computing device.

Example 54 includes the subject matter of any of Examples 52 and 53, and wherein the compression job request comprises a compress request to compress the uncompressed data, the one or more hardware compression resources comprises a compress/decompress/verify engine, the means for performing the compression job request comprises means for compressing the uncompressed data to generate the compressed data with the compress/decompress/verify engine, and the means for communicating the uncompressed data and the compressed data comprises means for inputting the uncompressed data and outputting the compressed data.

Example 55 includes the subject matter of any of Examples 52-54, and wherein the means for scheduling the compression job request comprises means for determining whether a compression level of the compression job request is flexible; and means for adjusting, in response to determining that the compression level of the compression job request is flexible, the compression level based on an I/O bandwidth availability.

Example 56 includes the subject matter of any of Examples 52-55, and wherein the means for determining whether the compression level of the compression job request is flexible comprises means for determining whether a requester specified that a compression level of the compression job request is flexible.

Example 57 includes the subject matter of any of Examples 52-56, and wherein the means for scheduling the compression job request further comprises means for adjusting, in response to determining that the compression level of the compression job request is flexible, the compression level based on an estimated time to compute the compression job request.

Example 58 includes the subject matter of any of Examples 52-57, and wherein the means for scheduling the compression job request further comprises means for determining the estimated time to compute the compression job request based on a number of jobs in a queue of the I/O subsystem.

Example 59 includes the subject matter of any of Examples 52-58, and wherein the means for adjusting the compression level based on the I/O bandwidth availability and the estimated time to compute comprises means for increasing the compression level to achieve lower compression ratio.

Example 60 includes the subject matter of any of Examples 52-59, and wherein the means for adjusting the compression level based on the I/O bandwidth availability and the estimated time to compute comprises means for decreasing the compression level to achieve higher compression ratio.

Example 61 includes the subject matter of any of Examples 52-60, and wherein the means for scheduling the compression job request comprises (i) means for determining whether one or more compression levels of compression job requests pending in a queue of the I/O subsystem are flexible, and (ii) means for adjusting, in response to determining that the one or more compression levels of the compression job requests are flexible, the one or more compression levels based on I/O bandwidth availability and on an estimated time to compute the compression job requests pending in the queue.

Example 62 includes the subject matter of any of Examples 52-61, and wherein the compression job request comprises a compress-verify request to compress the uncompressed data to generate compressed data and verify the compressed data, the one or more hardware compression resources comprises a compress/decompress/verify engine, the means for performing the compression job request comprises (i) means for compressing the uncompressed data to generate the compressed data and (ii) means for verifying the compressed data against the uncompressed data, and the means for communicating the uncompressed data and the compressed data comprises means for inputting the uncompressed data and outputting the compressed data.

Example 63 includes the subject matter of any of Examples 52-62, and wherein the means for compressing the uncompressed data comprises means for compressing the uncompressed data to generate the compressed data with the compress/decompress/verify engine; and the means for verifying the compressed data comprises means for verifying the compressed data with the compress/decompress/verify engine.

Example 64 includes the subject matter of any of Examples 52-63, and wherein the means for verifying the compressed data with the compress/decompress/verify engine comprises (i) means for disabling a compression function of the compress/decompress/verify engine and (ii) means for decompressing the compressed data with the compress/decompress/verify engine.

Example 65 includes the subject matter of any of Examples 52-64, and wherein the means for verifying the compressed data with the compress/decompress/verify engine comprises means for decompressing the compressed data with the compress/decompress/verify engine as a single-shot operation.

Example 66 includes the subject matter of any of Examples 52-65, and wherein the one or more hardware compression resources comprises a decompress engine, and verifying the compressed data comprises means for verifying the compressed data with the decompress engine using a verification technique.

Example 67 includes the subject matter of any of Examples 52-66, and wherein the verification technique comprises a checksum verification with the decompress engine.

Example 68 includes the subject matter of any of Examples 52-67, and wherein the verification technique comprises a full data comparison with the decompress engine.

Example 69 includes the subject matter of any of Examples 52-68, and wherein the means for verifying the compressed data with the decompress engine using the verification technique comprises means for verifying the compressed data using a verification technique based on an available bandwidth of the I/O subsystem.

Example 70 includes the subject matter of any of Examples 52-69, and wherein the means for verifying the compressed data comprises means for verifying the compressed data by a low-level software component of the computing device.

Example 71 includes the subject matter of any of Examples 52-70, and wherein the compression job request comprises a decompress request to decompress the compressed data, the means for performing the compression job request comprises means for decompressing the compressed data to generate the uncompressed data, and the means for communicating the uncompressed data and the compressed data comprises means for inputting the compressed data and outputting the uncompressed data.

Example 72 includes the subject matter of any of Examples 52-71, and wherein the one or more hardware compression resources comprises a decompress engine, and the means for decompressing the compressed data comprises means for decompressing the compressed data with the decompress engine.

Example 73 includes the subject matter of any of Examples 52-72, and wherein the one or more hardware compression resources comprises a compress/decompress/verify engine, and the means for decompressing the compressed data comprises means for decompressing the compressed data with the compress/decompress/verify engine.

Example 74 includes the subject matter of any of Examples 52-73, and wherein the means for decompressing the compressed data with the compress/decompress/verify engine comprises means for disabling a compression function of the compress/decompress/verify engine.

Example 75 includes the subject matter of any of Examples 52-74, and wherein the means for performing the compression job request comprises means for selecting a hardware compression resource from the one or more hardware compression resources of the accelerator complex to perform the compression job request based on I/O bandwidth availability.

Example 76 includes the subject matter of any of Examples 52-75, and wherein the I/O bandwidth availability is determined based on a number of jobs in a queue of the I/O subsystem.

The invention claimed is:

1. A computing device for flexibly compressing data, the computing device comprising:
   one or more processors; and
   an accelerator complex including digital logic resources to:
   receive a compression job request from the one or more processors;
   schedule the compression job request for one or more hardware compression resources of the accelerator complex;
   perform the compression job request with the one or more hardware compression resources in response to scheduling of the compression job request; and
   communicate uncompressed data and compressed data with an I/O subsystem of the computing device in response to performance of the compression job request.

2. The computing device of claim 1, wherein:
   the compression job request comprises a compress request to compress the uncompressed data,
   the one or more hardware compression resources comprises a compress/decompress/verify engine,
   to perform the compression job request comprises to compress the uncompressed data to generate the compressed data with the compress/decompress/verify engine, and
   to communicate the uncompressed data and the compressed data comprises to input the uncompressed data and to output the compressed data.

3. The computing device of claim 2, wherein to schedule the compression job request comprises to (i) determine whether a compression level of the compression job request is flexible, and (ii) adjust, in response to a determination that the compression level of the compression job request is flexible, the compression level based on I/O bandwidth availability.

4. The computing device of claim 3, wherein to determine whether the compression level of the compression job request is flexible comprises to determine whether a requester specified that a compression level of the compression job request is flexible.

5. The computing device of claim 3, wherein to schedule the compression job request further comprises to adjust, in response to a determination that the compression level of the compression job request is flexible, the compression level based on an estimated time to compute the compression job request.

6. The computing device of claim 2, wherein to schedule the compression job request comprises to (i) determine whether one or more compression levels of compression job requests pending in a queue of the I/O subsystem are flexible, and (ii) adjust, in response to a determination that the one or more compression levels of the compression job requests are flexible, the one or more compression levels based on I/O bandwidth availability and on an estimated time to compute the compression job requests pending in the queue.

7. The computing device of claim 1, wherein:
   the compression job request comprises a compress-verify request to compress the uncompressed data to generate compressed data and verify the compressed data,
   the one or more hardware compression resources comprises a compress/decompress/verify engine,
   to perform the compression job request comprises to (i) compress the uncompressed data to generate the compressed data and (ii) verify the compressed data against the uncompressed data, and
   to communicate the uncompressed data and the compressed data comprises to input the uncompressed data and to output the compressed data.

8. The computing device of claim 7, wherein to compress the uncompressed data comprises to compress the uncompressed data to generate the compressed data with the compress/decompress/verify engine; and to verify the compressed data comprises to verify the compressed data with the compress/decompress/verify engine.

9. The computing device of claim 8, wherein to verify the compressed data with the compress/decompress/verify engine comprises to (i) disable a compression function of the compress/decompress/verify engine and (ii) decompress the compressed data with the compress/decompress/verify engine.

10. The computing device of claim 1, wherein:
the compression job request comprises a decompress request to decompress the compressed data,
to perform the compression job request comprises to decompress the compressed data to generate the uncompressed data, and
to communicate the uncompressed data and the compressed data comprises to input the compressed data and to output the uncompressed data.

11. The computing device of claim 10, wherein the one or more hardware compression resources comprises a decompress engine, and to decompress the compressed data comprises to decompress the compressed data with the decompress engine.

12. The computing device of claim 10, wherein the one or more hardware compression resources comprises a compress/decompress/verify engine, and to decompress the compressed data comprises to decompress the compressed data with the compress/decompress/verify engine and disable a compression function of the compress/decompress/verify engine.

13. One or more non-transitory, machine-readable storage media comprising a plurality of instructions stored thereon that, when executed by a compute device cause the compute device to:
receive a compression job request;
schedule the compression job request for one or more hardware compression resources of an accelerator complex;
perform the compression job request with the one or more hardware compression resources in response to scheduling of the compression job request; and
communicate uncompressed data and compressed data with an I/O subsystem of the computing device in response to performance of the compression job request.

14. The one or more non-transitory, machine-readable storage media of claim 13, wherein:
the compression job request comprises a compress request to compress the uncompressed data,
the one or more hardware compression resources comprises a compress/decompress/verify engine,
to perform the compression job request comprises to compress the uncompressed data to generate the compressed data with the compress/decompress/verify engine, and
to communicate the uncompressed data and the compressed data comprises to input the uncompressed data and to output the compressed data.

15. The one or more non-transitory, machine-readable storage media of claim 14, wherein to schedule the compression job request comprises to (i) determine whether a compression level of the compression job request is flexible, and (ii) adjust, in response to a determination that the compression level of the compression job request is flexible, the compression level based on I/O bandwidth availability.

16. The one or more non-transitory, machine-readable storage media of claim 13, wherein:
the compression job request comprises a compress-verify request to compress the uncompressed data to generate compressed data and verify the compressed data,
the one or more hardware compression resources comprises a compress/decompress/verify engine,
to perform the compression job request comprises to (i) compress the uncompressed data to generate the compressed data and (ii) verify the compressed data against the uncompressed data, and
to communicate the uncompressed data and the compressed data comprises to input the uncompressed data and to output the compressed data.

17. The one or more non-transitory, machine-readable storage media of claim 13, wherein:
the compression job request comprises a decompress request to decompress the compressed data,
to perform the compression job request comprises to decompress the compressed data to generate the uncompressed data, and
to communicate the uncompressed data and the compressed data comprises to input the compressed data and to output the uncompressed data.

18. An accelerator complex for flexibly compressing data, the accelerator complex comprising digital logic resources to:
receive a compression job request from a processor of a computing device;
schedule the compression job request for one or more hardware compression resources of the accelerator complex;
perform the compression job request with the one or more hardware compression resources in response to scheduling of the compression job request; and
communicate uncompressed data and compressed data with an I/O subsystem of the computing device in response to performance of the compression job request.

19. The accelerator complex of claim 18, wherein:
the compression job request comprises a compress request to compress the uncompressed data,
the one or more hardware compression resources comprises a compress/decompress/verify engine,
to perform the compression job request comprises to compress the uncompressed data to generate the compressed data with the compress/decompress/verify engine, and
to communicate the uncompressed data and the compressed data comprises to input the uncompressed data and to output the compressed data.

20. The accelerator complex of claim 18, wherein:
the compression job request comprises a compress-verify request to compress the uncompressed data to generate compressed data and verify the compressed data,
the one or more hardware compression resources comprises a compress/decompress/verify engine,
to perform the compression job request comprises to (i) compress the uncompressed data to generate the compressed data and (ii) verify the compressed data against the uncompressed data, and
to communicate the uncompressed data and the compressed data comprises to input the uncompressed data and to output the compressed data.

21. The accelerator complex of claim 20, wherein to compress the uncompressed data comprises to compress the uncompressed data to generate the compressed data with the compress/decompress/verify engine; and to verify the compressed data comprises to verify the compressed data with the compress/decompress/verify engine.

22. The accelerator complex of claim 21, wherein to verify the compressed data with the compress/decompress/verify engine comprises to (i) disable a compression function of the compress/decompress/verify engine and (ii) decompress the compressed data with the compress/decompress/verify engine.

23. The accelerator complex of claim 18, wherein:
the compression job request comprises a decompress request to decompress the compressed data,
to perform the compression job request comprises to decompress the compressed data to generate the uncompressed data, and
to communicate the uncompressed data and the compressed data comprises to input the compressed data and to output the uncompressed data.

24. The accelerator complex of claim 23, wherein the one or more hardware compression resources comprises a decompress engine, and to decompress the compressed data comprises to decompress the compressed data with the decompress engine.

25. The accelerator complex of claim 23, wherein the one or more hardware compression resources comprises a compress/decompress/verify engine, and to decompress the compressed data comprises to decompress the compressed data with the compress/decompress/verify engine and disable a compression function of the compress/decompress/verify engine.

* * * * *